(12) United States Patent
Patterson et al.

(10) Patent No.: US 10,580,111 B2
(45) Date of Patent: Mar. 3, 2020

(54) DISPLAY INK RENDERING DURING SYSTEM SLEEP

(71) Applicant: Microsoft Tedchnology Licensing, LLC, Redmond, WA (US)

(72) Inventors: Douglas Robert Millar Patterson, Sammamish, WA (US); William Hong Vong, Hunts Point, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/926,741

(22) Filed: Mar. 20, 2018

(65) Prior Publication Data

US 2019/0295212 A1 Sep. 26, 2019

(51) Int. Cl.
| *G06T 1/60* | (2006.01) |
| *G06F 3/0488* | (2013.01) |
| *G06F 3/041* | (2006.01) |
| *G09G 5/36* | (2006.01) |
| *G09G 5/395* | (2006.01) |
| *G09G 5/393* | (2006.01) |
| *G09G 5/377* | (2006.01) |
| *G09G 3/20* | (2006.01) |

(52) U.S. Cl.
CPC .............. *G06T 1/60* (2013.01); *G06F 3/0412* (2013.01); *G06F 3/04883* (2013.01); *G09G 3/20* (2013.01); *G09G 5/363* (2013.01); *G09G 5/377* (2013.01); *G09G 5/393* (2013.01); *G09G 5/395* (2013.01); *G09G 2330/021* (2013.01); *G09G 2370/10* (2013.01); *G09G 2370/12* (2013.01)

(58) Field of Classification Search
CPC ...... G06T 1/60; G06F 3/0412; G06F 3/04883
See application file for complete search history.

(56) References Cited

U.S. PATENT DOCUMENTS

| 6,943,667 B1 | 9/2005 | Kammer et al. |
| 8,203,527 B2 | 6/2012 | Low et al. |
| 8,284,179 B2 | 10/2012 | Chen |
| 8,782,291 B2 | 7/2014 | Toorians et al. |
| 9,372,571 B2 | 6/2016 | Williams et al. |

(Continued)

OTHER PUBLICATIONS

"International Search Report & Written Opinion for PCT Application No. PCT/US19/021524", dated May 31, 2019, 15 Pages.

*Primary Examiner* — Mark Edwards
(74) *Attorney, Agent, or Firm* — NovoTechIP International PLLC (57) ABSTRACT

A device includes a digitizer in communication with a touch sensor and configured to generate touchscreen data indicative of an ink stroke, a processor configured to generate image data for rendering on a display panel, and a display controller configured to receive the image data and to generate pixel control signals for the display panel from the image data. The display controller includes a memory to store frame data derived from the image data by the display controller, and an ink rendering engine configured to generate ink image data from the touchscreen data while the processor resides in a sleep mode. The ink rendering engine is coupled to the memory to store the ink image data in the memory as the frame data such that the pixel control signals direct the display panel to render the ink stroke while the processor remains in the sleep mode.

17 Claims, 3 Drawing Sheets

(56) References Cited

U.S. PATENT DOCUMENTS

| | | | |
|---|---|---|---|
| 9,389,717 B2 | 7/2016 | Bathiche et al. | |
| 9,395,800 B2 | 7/2016 | Liu et al. | |
| 9,529,463 B1* | 12/2016 | Ramani | G06F 3/0416 |
| 9,632,594 B2 | 4/2017 | Hicks et al. | |
| 9,633,466 B2 | 4/2017 | Tu et al. | |
| 2002/0042888 A1 | 4/2002 | Lekuch et al. | |
| 2007/0239921 A1* | 10/2007 | Toorians | G06F 1/1616 |
| | | | 710/306 |
| 2010/0277429 A1* | 11/2010 | Day | G06F 3/0416 |
| | | | 345/173 |
| 2012/0182223 A1 | 7/2012 | Zeng et al. | |
| 2014/0168096 A1* | 6/2014 | Bathiche | G06F 3/0412 |
| | | | 345/173 |
| 2016/0077782 A1 | 3/2016 | Choi et al. | |
| 2017/0010687 A1* | 1/2017 | Seo | G06F 3/038 |
| 2017/0115754 A1 | 4/2017 | Kumar et al. | |
| 2017/0345395 A1 | 11/2017 | Shim et al. | |

* cited by examiner

DISPLAY INK RENDERING DURING SYSTEM SLEEP

DESCRIPTION OF THE DRAWING FIGURES

For a more complete understanding of the disclosure, reference is made to the following detailed description and accompanying drawing figures, in which like reference numerals may be used to identify like elements in the figures.

The embodiments of the disclosed devices and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION

Described herein are devices and methods for rendering display ink strokes while a processor, such as a central processing unit (CPU) and/or a graphics processing unit (GPU), resides in a low power state—i.e., a sleep mode. The disclosed devices include a display controller in communication with a digitizer via a bypass rendering path that bypasses the processor. The display controller has an ink rendering engine coupled to a memory so that display ink strokes are rendered and maintained without having to rely on the processor. The display ink strokes are thus captured and rendered while the device is, or appears to be, otherwise asleep, like pen on paper. When the device is asleep, a pen or other stylus or other touch may thus be used to write on the display, e.g., with white ink appearing on a black background. The ink stroke rendering may thus be considered or referred to as "darkboard rendering." With the processor asleep, the display ink strokes are thus rendered at much lower power levels. Indeed, the device may remain in the sleep mode throughout the rendering process and the inking session. Battery life is accordingly not significantly affected.

Bypassing a main or primary touchscreen data path of the device also allows the display ink strokes to be rendered with less delay (e.g., startup delay). Using the display controller to render the ink strokes avoids having to wake or startup the processor of the device. In addition to the processor wake-up, data is also read from storage and written to memory, and the processor has to start running the operating system to bring up all of the device subsystems before the display can start rendering display ink. Waiting for both the processor and the operating system to be operational may consumer a number of seconds. In contrast, the display controller (e.g., a timing controller) may be operational in a much shorter time frame, e.g., about 30 milliseconds. The disclosed devices and methods thus provide a user experience significantly closer to picking up a pen and writing on paper.

The disclosed devices and methods avoid having to keep the processor and operating system awake to provide such instantaneous behavior. For instance, other devices that allow note taking with a stylus to begin by tapping the touchscreen require that the processor and operating system be already awake and rendering a lock or other login screen. The processor of the disclosed devices may instead reside in a sleep mode and remain in the sleep mode for the duration of the note-taking or other inking session. Significantly power consumption savings may thus be realized.

The disclosed devices and methods also avoid having to rely on a trigger event that consumes an extended period of time. For example, a trigger event that forces a user to eject a stylus from a holster, garage, or other holder gives the device processor and operating system time to wake up. In contrast, the disclosed devices and methods allow the trigger event and ink strokes to be essentially simultaneous. For example, one trigger event may be or include tapping a button of, or otherwise grasping, a pen or stylus. In other examples (e.g., when a digitizer of the device resides in a suitably low power state), the trigger event may involve proximity of the pen to the touchscreen. In these ways, the act of beginning to use the pen is thus capable of triggering the display ink rendering.

The disclosed methods and devices use an ink rendering engine of the display controller. The ink rendering engine allows ink strokes to be rendered without having to rely on the processor (e.g., CPU and/or GPU). The processor may thus remain in a sleep mode. In some cases, the ink rendering engine is also used when the processor is awake and operational. For example, the ink rendering engine may be used to reduce latency between the movement of the pen tip and the rendering of the ink stroke. Further details regarding use of the ink rendering engine and the latency reduction are set forth in U.S. Pat. No. 9,389,717, the entire disclosure of which is hereby incorporated by reference.

As described herein, the use of the ink rendering engine is expanded to allow any number of ink strokes to be written to a memory, such as an internal frame buffer of the display controller. The display ink may thus be rendered without requiring the processor (e.g., the CPU and/or GPU). Waking up quickly, the timing controller is capable of rendering the ink strokes essentially instantaneously. In the meantime, the processor may proceed to waking up in the background or, the processor may be left asleep, in which case the display controller is capable of handling the entire note-taking session. Eventually, the processor may be woken upon detection of another trigger, such as the typical power button press. In some cases, the internal frame buffer is or includes a random access or other memory of the timing controller that supports features such as Panel Self Refresh, Frame Rate Control, or Overdrive.

The nature of the disclosed devices may vary considerably. For instance, the form factor of the devices may vary from handheld, worn, or other portable devices to desktop, wall-mounted, or other large scale devices. The devices may or may not be computing devices. For instance, the disclosed methods may be useful in connection with television sets in addition to smartphones and tablets.

Figure 1:
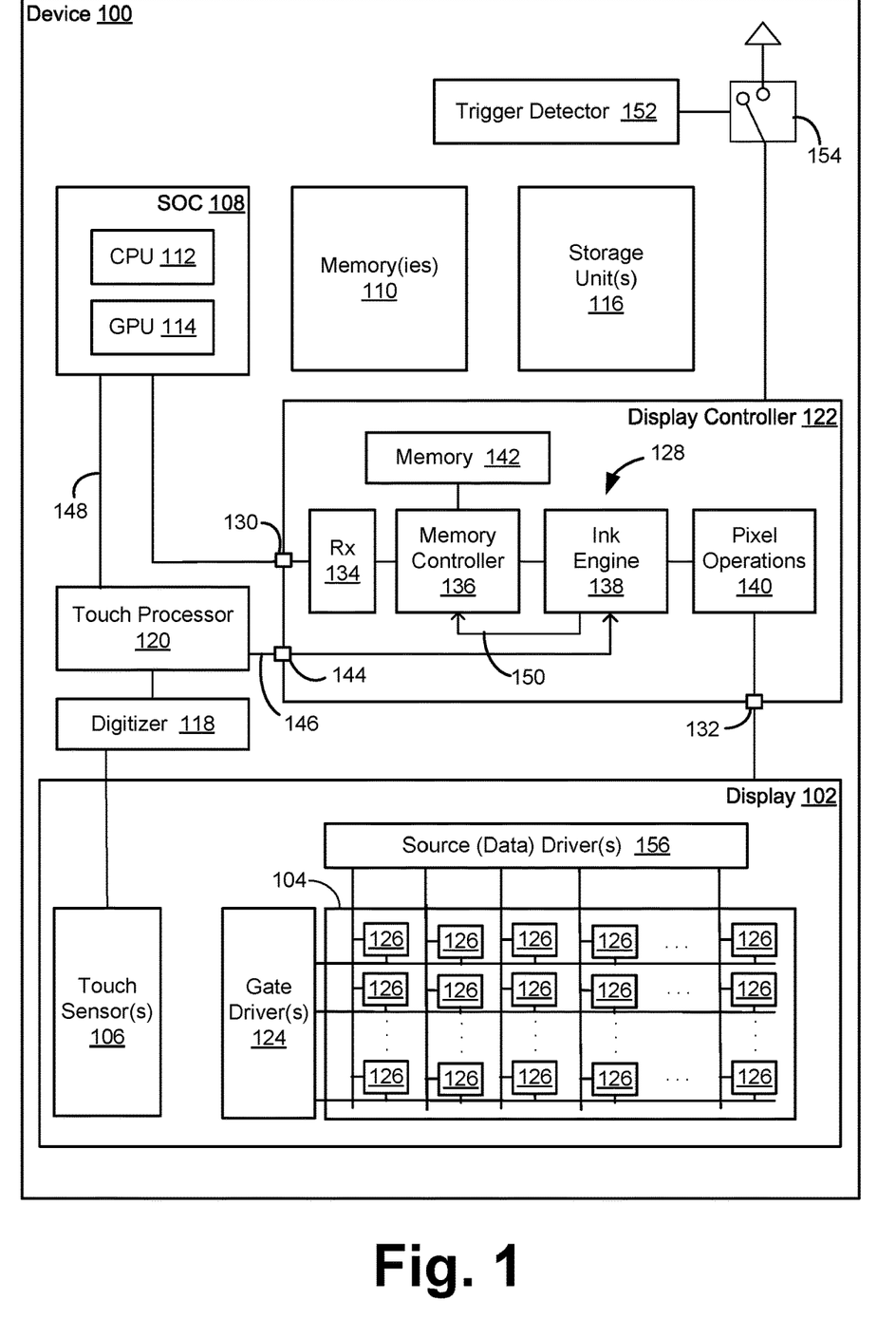
FIG. 1 is a block diagram of a device having a display controller configured to implement display ink stroke rendering during system sleep in accordance with one example.

FIG. 1 depicts a device 100 in which display ink rendering is implemented in accordance with one example. The device 100 includes a display 102. The display 102 is a touchscreen display. The display 102 accordingly includes a display panel 104 and one or more touch sensors 106 disposed along the display panel 104. In some cases, the touch sensor 106 may be or include an array of touch-sensitive elements. The device 100 may be or include any electronic device having a touchscreen or other touch-sensitive display, including, for instance, a smartphone, tablet, notebook computer, or smart television or other display.

The touch sensor 106 may be or include a touch-sensitive film disposed across the display panel 104. For example, the touch-sensitive film may be adhered to, or otherwise disposed along, a cover glass of the display panel 104. In capacitive touch cases, the touch-sensitive film comprises an array of capacitive sensing elements. Other types of touch sensors may be used, including, for instance, resistive and acoustic touch sensors.

The device 100 includes a processor or processing unit 108 and one or more memories 110. The processor 108 is configured to generate image data for rendering on the display panel 104. The processor 108 may be configured via instructions and/or data provided via the memory 110. Alternatively or additionally, the processor 108 includes integrated memory on which the instructions and/or other instructions are stored.

The processor 108 may be or include a general purpose, programmable processor. The memory 110 may be directly addressable by the processor 108. Instructions and/or other data stored on the memory 110 may configure to the processor 108 to implement tasks and/or other operations. For instance, the operations may be directed to providing general graphics processing for the device 100. The processor 108 may thus generate or provide image data to be rendered on the display 102. In some cases, the operations include implementing an operating system, and executing applications running with an environment established by the operating system. Alternative or additional operations may be implemented. For instance, the processor 108 may be configured to implement a number of background services for the device 100, including, for instance, data communication services.

The term, general graphics processing, is used herein to include the processing of image data representative of a variety of different types of images. In contrast, ink stroke graphics processing is a specific type of graphics processing related to image data representative of ink strokes.

The processor 108 may include any number of processors, processing units, cores, or other elements. In the example of FIG. 1, the processor 108 includes a central processing unit (CPU) 112 and a graphics processing unit (GPU) 114 integrated with one another as a system-on-a-chip (SOC). The extent of the integration may vary. For instance, the CPU 112 and the GPU 114 may be disposed on a separate integrated circuit (IC) chips in other cases. The GPU 114 (and/or other unit of the processor 108) is configured to generate image data to support the general graphics processing for the device 100. The image data may be representative of a variety of different types of images, including any type of graphics as well as ink strokes. The image data may include both ink-related image data as well as non-ink image data.

Instructions and/or other data for the processor 108 are stored on one or more storage units 116. The storage unit 116 may be or include a flash storage or other drive or other non-volatile storage unit. Instructions or data are read from the storage device 116 and then written to the memory 110 for use by the processor 108.

The memory 110 may be or include, for example, a random access memory (RAM) unit. Additional or alternative memories may be included. For instance, the device 100 may include one or more read-only memories (ROM) on which firmware and other instructions are stored.

The processor 108, the memory 110, and the storage unit 116 may be considered to be components of a computing system of the device 100. These components may thus be referred to herein as system level components. System level components are involved in general processing, memory, storage, and control of various subsystems, or modules, of the device 100. For instance, the computing system may be considered to include components involved in directing the display 102 and other input/output devices, modules, or units of the device 100. In contrast, processing, memory, or other components directed to a specific function, such as display functionality, may be considered to be at a module level, as in components of the display module. The device 100 has a number of additional subsystems or modules (e.g., a respective subsystem for each input/output component, such as a touch subsystem), as opposed to a single system level.

The processor 108 is configured to operate in one or more low power modes, referred to herein as sleep modes. The general graphics functionality of the processor 108 is suspended while the processor 108 resides in a sleep mode. For instance, image data is not generated by the processor 108 in a sleep mode. But the suspension of operations in a sleep mode extends beyond the graphics functionality of the processor 108. For instance, the processor 108 is deactivated to a greater extent in a sleep mode than the deactivation that occurs during, for example, implementation of a panel self refresh routine. Any number of general purpose operations of the processor 108 are also suspended. A sleep mode may accordingly be referred to herein as a system sleep mode. As described below, the device 100 is configured to provide display ink rendering while the processor 108 resides in a sleep mode.

The device 100 includes a number of components directed to supporting the touchscreen display functionality of the device 100. In this example, the device 100 includes a digitizer 118 and a touch processor 120. The digitizer 118 receives one or more signals from the touch sensor 106. The signals may be representative of a number of different types of information regarding a user's interaction with the display 102, including, for instance, the type or other characteristics of the interaction (e.g., ink stroke, gesture, touch, proximity interaction), a pressure level, a surface area, a duration or other time indication, location, direction (e.g., a directional vector), and tilt (e.g., orientation of stylus). The digitizer 118 may generate digital representations of such information via conversion or other processing of one or more analog signals (e.g., capacitance signals).

The digital representations from the digitizer 118 are provided to the touch processor 120. The touch processor 120 may be further processed by the touch processor 120 when, for instance, the interaction is or involves an ink stroke with a pen, stylus or other instrument (including a finger acting as a writing instrument). For example, the touch processor 120 may generate data indicative of the coordinates, pressure, and other characteristics of the ink stroke. The data generated by the touch processor 120 may include any data type pertinent to the manner in which the ink stroke is to be rendered on the display panel 104.

The digitizer 118 and the touch processor 120 may be integrated to any desired extent. For example, the functionality of the touch processor 120 may be provided by the digitizer 118 in some cases. In those and other cases, the device 100 may not include the touch processor 120. For instance, still other components of the device 100 may implement the processing functionality of the touch processor 120. For instance, the touch processor 120 may alternatively or additionally be integrated with the display controller 122 to any desired extent. Further details regarding alternative implementations of the touch processor 120 and other functionality are set forth in U.S. Patent Publication No. 2012/0182223, the entire disclosure of which is hereby incorporated by reference.

The device 100 also includes a display controller 122 directed to control the display panel 104 or, more generally, the display 102. During normal operation of the device 100, the display controller 122 receives image data from the processor 108 for the images to be rendered on the display panel 104. The display controller 122 is configured to generate pixel control signals for the display panel 104 from the image data. The pixel control signals are configured to direct one or more source (or data) drivers 156 and one or more gate drivers 124 of the display 102. Together, the source and gate drivers 156, 124 send control signals to individually control pixels (or sub-pixels) 126 of the display panel 104.

In some cases, the display controller 122 is, is configured as, or includes, a timing controller (TCON). The display controller 122 may determine or otherwise control the timing of the pixel control signals. The timing is determined to appropriately render the images representative of the image data received from the processor 108 given the refresh rate and other characteristics of the display 102.

The display controller 122 may be configured to process the image data from the processor via a processing pipeline 128. The pipeline 128 may begin with an image data input 130 of the display controller 122 to which the image data is provided. The display controller 122 includes a pixel control output 132 at which the pixel control data is provided for the display panel 104. The pixel control output 132 is coupled to the image data input 130 to define the image data processing pipeline 128. The configuration, construction, nature, and other characteristics of the input 130 and the output 132 may vary. For instance, the input 130 and the output 132 may be or include a respective port, such as an IC chip pin, or may correspond with a circuit node at the location shown.

The display controller 122 includes a number of components or elements disposed along the pipeline 128. In the example of FIG. 1, the display controller 122 includes a receiver 134, a memory controller 136, an ink rendering engine 138, and one or more pixel operations units 140. The order of the elements along the pipeline 128 may vary from the example shown. For instance, one or more of the pixel operations units 140 may be disposed before one of the other depicted elements. Additional, fewer or alternative elements may be included. For instance, the pipeline 128 may include a component or element directed to deriving frame data from pixel data.

The receiver 134 may be configured to process the image data provided by the processor 108 at the input 130. In some cases, the image data is provided in packet form, e.g., via packetized data transmissions. For example, the image data may be provided in packets formatted and otherwise formed in accordance with the embedded displayport (eDP) interface standard. Other video interface standards or protocols may be used, such as the DisplayPort interface protocol.

The receiver 134 may be configured to generate pixel data from the image data provided by the processor 108. For instance, the receiver 134 may convert the packets of the image data into respective data for each pixel 126 of the display panel 104. The pixel data may be assembled or arranged by the receiver 134 into respective frames (frame data) to be rendered concurrently (or effectively concurrently) on the display panel 104. Alternatively, the frame data is assembled or otherwise derived from the image data by another component along the pipeline 128. For example, in some cases, the frame data is derived from the pixel data by the memory controller 136.

The pixel data or the frame data is provided to the memory controller 136. The memory controller 136 is configured to store the frame data derived from the image data in a memory 142. For example, the frame data for each frame may be stored in the memory 142 as a respective dataset. The memory 142 may thus be configured as or otherwise considered a frame buffer. The memory 142 may include one or more random access memory (RAM) or other units. In some cases, the memory controller 136 and the memory 142 are configured to support and/or otherwise implement a panel self refresh routine via storage of the frame data in the memory 142. Alternatively or additionally, the memory 142 is used to support other routines or procedures, such as frame rate control and overdrive procedures.

The pixel operation unit(s) 140 are configured to use the frame data to generate pixel control signals for the display panel 104. The pixel control signals are configured for use by the source and gate drivers 156, 124. The pixel control signals are representative of the timing involved in updating the images rendered via the display panel 104. The timing established by the pixel operations unit(s) 140 may include synchronizing various clocks involved in the graphics processing for the device 100. For instance, the synchronization may involve raster synchronization and vertical synchronization. Raster synchronization synchronizes the raster lines of the display 102 with the raster lines of the digitizer 118. Vertical synchronization synchronizes the vertical refresh rate of the display 102 with the vertical refresh rate of the digitizer 118. Alternative or additional pixel operations may be implemented. For example, the pixel operations may include, without limitation, gamma correction, ambient color correction, color gamut mapping (e.g., through a three-dimensional lookup table), dithering, dynamic backlight control, and sub-pixel optimization (e.g. for Pentile displays). Further details regarding the synchronization functionality are set forth in the above-referenced U.S. patent.

The frame data provided to the pixel operation unit(s) 140 may have data representative of ink strokes incorporated therein as described below. The ink rendering engine 138 and/or another element of the display controller 122 may be configured to merge or blend such data into the frame data. The manner in which the merging or blending occurs may vary in accordance with, for instance, the nature of the underlying frame data (e.g., static frame data, dynamic frame data, background frame data, etc.).

The ink rendering engine 138 is configured to generate ink image data from the touchscreen data from the digitizer 118. The touchscreen data is provided to the display controller 122 via a data path 146 via which the touchscreen data bypasses the processor 108. The touchscreen data is provided from the digitizer 118 to the touchscreen input 144 without having to pass through the processor 108. The data path 146 may thus be considered a bypass touchscreen data path. In contrast, the touchscreen data is provided to the processor 108 via a primary touchscreen data path 148. The processor 108 is coupled to the digitizer 118 via the primary touchscreen data path 148 to receive the touchscreen data such that, when the processor 108 is awake, the image data may be indicative of ink strokes. In this example, the touchscreen data is received at a touchscreen input 144 of the display controller 122 after processing by the touch processor 120. The touchscreen input 144 may be an input port (e.g., pin) or other node.

The nature of the data paths 146, 148 may differ from the example shown. For instance, the touch processor 120 may have a single output port or other output node to which a single data line (or set of data lines) is connected. The data line(s) may then be tapped to establish the data path 146. The data paths 146, 148 may thus share a common data line before branching off from one another.

The ink rendering engine 138 includes a processor. The processor is coupled to the touchscreen input 144 to process the touchscreen data to generate ink image data from the touchscreen data. The processor may be a task-specific processor as opposed to a general-purpose processor. For example, the processor may be configured to execute ink engine rendering tasks. In some cases, the processor is not capable of executing tasks other than ink engine rendering tasks or tasks unrelated to ink engine rendering. The processor may be considered an ink engine task-specific processor. The processor may be integrated with one or more other components of the ink rendering engine 138, such as one or more buffers or other memory(ies) in which instructions and/or data are stored. For instance, the ink rendering engine 138 may be realized as an application-specific integrated circuit (ASIC) chip with embedded memory. Further details regarding the ink rendering engine 138 are set forth in the above-referenced U.S. patent.

In some examples, the ink rendering engine 138 includes a number of buffers (e.g., sprite buffers), each of which may be or include a rectangular memory buffer sufficiently large to hold the rendered pixels for an ink stroke. Ink rendering in such cases may proceed as follows. When touchscreen data for a touch event is obtained, the oldest sprite is cleared, a new ink stroke is drawn therein, and the appropriate coordinate (e.g., X,Y) origin is set. On each single video pixel, the ink rendering engine 138 hit-tests all of the sprite rectangles, and blends the sprite rectangles that overlap the current video pixel onto the background, which is the video frame from the operating system. When drawing an ink stroke to a sprite, the percentage of each pixel covered by the ink stroke is determined, and assigned a corresponding alpha value. For example, if eight bits are used, then an alpha value of 0 may correspond with no ink touches for a pixel, and a value of 255 may be indicative of a pixel completely covered by the ink. When the ink rendering engine 138 implements a blend operation, the ink rendering engine 138 may use the alpha value to linearly interpolate between the ink color and the background color, as in, for example, final_pixel_colour=ink_color*alpha+background_color* (255−alpha). The configuration and other characteristics of the ink rendering engine 138 may vary considerably from the above-described sprite drawing and per pixel blending operations.

The above-described operations (e.g., the sprite drawing operations) may be implemented by an embedded processor in the ink rendering engine 138. Other operations (e.g., the per pixel blending operation) may be handled by dedicated logic circuitry (e.g., transistor circuitry) in the ink rendering engine 138.

The ink rendering engine 138 and/or the display controller 122 may be in communication with the processor 108 to obtain instructions and/or data to support the ink rendering processing. For example, the ink rendering engine 138 may obtain data indicative of an ink style via which the ink strokes are to be rendered. The ink style data may specify, for instance, color and line thickness. Additional, fewer, or other characteristics may be specified. Alternatively, the ink style for the ink rendering engine 138 is predetermined.

The ink rendering engine 138 is configured to generate the ink image data while the processor 108 resides in a sleep mode. During the sleep mode, the processor 108 is not providing image data via the input 130. During the sleep mode, in the absence of the inking captured via the digitizer, the display panel 104 is not activated. In cases in which the display 102 includes a backlight unit, the backlight unit is not emitting light during the sleep mode in the absence of the inking. The sleep mode is not limited to graphics-related processing and image display functions. For instance, the processor 108 may have one or more cores or other portions deactivated during the sleep mode to reduce power consumption.

The generation of the ink image data by the display controller 122 allows ink strokes to be rendered and sustained on the display 102 without having to rely on the processor 108. The ink strokes may be entered by a user with a pen, stylus, or other instrument, including a finger. The ink strokes are rendered while the processor 108 is in a sleep operational mode and, thus, the display 102 appears to be deactivated. The ink stroke rendering may thus be similar to a pen writing on paper. For instance, the ink strokes may be rendered in white ink on a black background.

The ink rendering engine 138 is coupled to the memory 142 to store the ink image data in the memory 142. The ink image data may thus be stored as frame data in the memory 142 for use in, for instance, panel refreshing. As a result, the pixel control signals generated for the display panel 104 are capable of continuing to direct the display panel 104 to render the ink stroke, e.g., all while the processor remains in the sleep mode. In the example of FIG. 1, the coupling is via the memory controller 136. The coupling may be established via a connection or communication path outside of the pipeline 128. For instance, the coupling may be established via a data path 150. The data path 150 may or may not be dedicated to the coupling. The coupling may alternatively or additionally include or involve a memory bus to which the ink rendering engine 138 is connected or otherwise has access.

The above-described ink stroke rendering provided by the engine 138 and the display controller 122 is not directed to temporary rendering. For instance, the ink stroke rendering does not merely fill the gap until the processor 108 wakes up and provides image data representative of the ink strokes. Storage of the ink image data in the memory 142 allows the rendered ink strokes to remain displayed by the display panel 104. The rendering may be maintained for panel self refresh purposes during a single usage session as well as across multiple usage sessions. In the latter case, the ink strokes rendered during one usage session are rendered again when the user begins another usage session (e.g., while the processor 108 remains asleep). In some cases, the rendered ink strokes may be displayed for a predetermined length of time before the display 102 is deactivated to save power. When additional ink strokes are captured, the previously rendered ink strokes are rendered again.

The ink rendering provided by the display controller 122 is activated via detection of one or more trigger events. The trigger event is detected by a trigger detector 152. In the example of FIG. 1, detection of the trigger event causes a control signal to be delivered to a power control switch 154. The power control switch 154 is disposed between power supply and display controller. Closing the power control switch 154 connects the display controller 122 to a power supply as shown. The display controller 122 may thus be supplied with power and activated while the processor 108 remains asleep. A similar switched power connection may be provided to activate one or more components of the display 102, such as the gate and source drivers 156, 124 of the display panel 104 and, in some cases, a backlight unit.

The nature of the trigger event may vary considerably. The configuration and other characteristics of the trigger detector 152 vary accordingly. For example, the trigger event may or may not involve the pen, stylus, or other instrument. In some cases, the trigger event may be or include pushing a button on the instrument or the device 100. The trigger detector 152 may thus be or include a sensor (e.g., a current or voltage sensor) that detects a signal generated as a result of the button push. In other cases, the instrument may be configured such that grasping the instrument (e.g., in a predetermined way) causes a signal to be transmitted for detection by a sensor of the trigger detector 152.

The trigger detector 152 may be incorporated into the digitizer 118 and/or the touch processor 120. For instance, the trigger detector 152 may be configured to detect the proximity of the instrument to the display panel 104. The display controller 122 may thus be activated just as the user begins to write. The digitizer 118 may remain in a low-power state to support the proximity detection.

In non-instrument cases, the trigger event may be or include grasping the device 100 in a predetermined manner. For example, the device 100 may have one or more sensors (e.g., capacitive sensors) integrated in a device housing to detect when the user holds the device 100 in a manner conducive to note-taking, drawing, or other inking. The trigger detector 152 may alternatively detect the press of a keyboard or other button on the device 100. Other types of sensors (audio, visual, etc.) may be used for the trigger detector 152.

The trigger detector 152 may be integrated with one or more other components of the device 100. For instance, the trigger detector 152 may be integrated with a power supply of the device 100. The trigger detector 152 and the switch 154 may be integrated to any desired extent.

The ink rendering engine 138 may generate the ink image data for storage in the memory 142 outside of when the image data is not being received via the input 130. The ink rendering engine 138 may be active when the processor 108 is not asleep. In such cases, the memory controller 136 may determine whether to store the ink image data from the ink rendering engine 138 in the memory 142. In some circumstances, the ink image data may be stored (and used) even though the image data from the processor 108 will be shortly arriving via the input 130. For example, such use of the ink image data may be useful to reduce latency, as described in the above-referenced U.S. patent.

The display controller 122 may be configured to blend the frame data from the ink rendering engine 138 with background frame data stored in the memory 142. The background frame data may be representative of various types of images. For example, the background frame data may be indicative of previous ink strokes (e.g., a prior session), directed to supporting note-taking (e.g., a lined notebook page), or representative of an image generated via the processor 108 prior to entering the sleep mode (e.g., a form document with placeholders for which text is to be written). Such frame data may be permanently stored in the memory 142 and/or written to the memory 142 as the processor 108 enters the sleep mode.

The display controller 122 may include additional components or other elements. The additional elements may or may not be disposed along the pipeline 128. For instance, one or more backlight unit control elements may be included.

The display controller 122 may be realized on one or more IC chips. The functionality of the display controller 122 may be integrated to any desired extent. In some cases, the display controller 122 is implemented in a multi-component package. In still other cases, one or more aspects of the display controller 122 may be implemented on a printed circuit board or other circuit arrangement.

Figure 2:
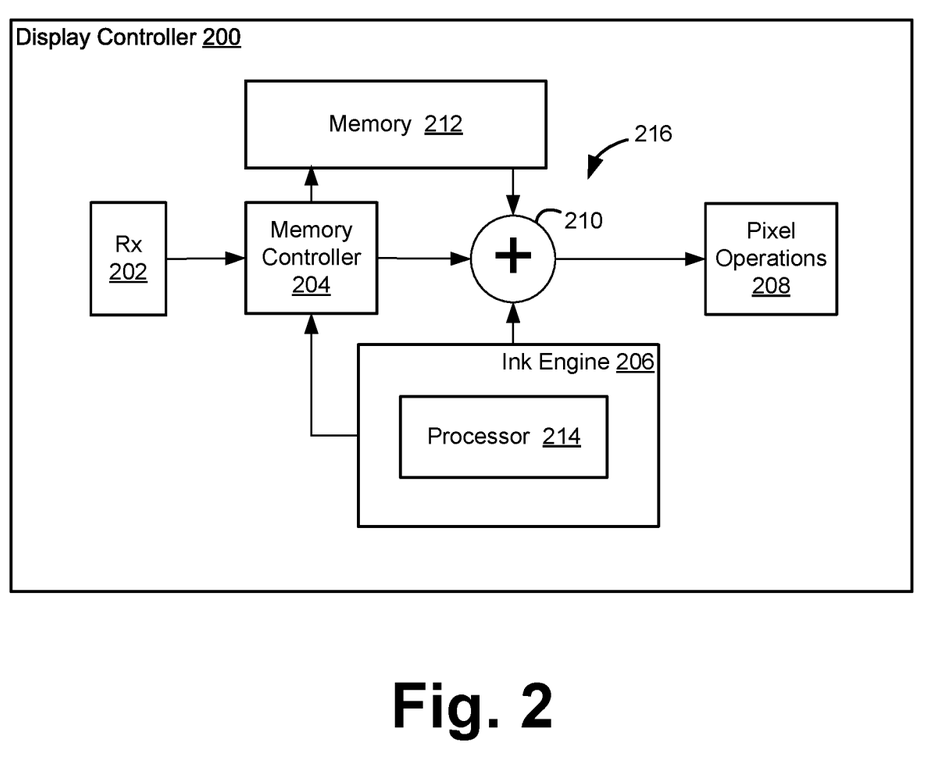
FIG. 2 is a block diagram of a display controller configured to implement display ink stroke rendering during system sleep in accordance with another example.

FIG. 2 depicts a display controller 200 configured to support ink stroke rendering during system sleep in accordance with one example. The display controller 200 may be used in any of the devices described herein, including, for example, the device 100 of FIG. 1, or another device. The ink stroke rendering is provided by the display controller 200 while a processor of the device resides in a sleep mode upon detection of a trigger event, as described above.

The display controller 200 may have a number of components, aspects, or other characteristics in common with the above-described examples. For instance, the display controller 200 may include a receiver 202, a memory controller 204, an ink rendering engine 206, and one or more pixel operations units 208. These components are arranged along a processing pipeline 216 as described above. Other components or aspects may also be in common. For instance, the display controller may include similar input(s) and output(s). The display controller 200 may also be configured as, or include, a timing controller.

The display controller 200 differs from the above-described examples in connection with the manner in which the ink image data from the ink rendering engine 206 is introduced, e.g., merged or blended with frame data. In this case, the ink engine 206 provides the ink image data to a mixer unit 210 of the display controller 200. The mixer unit 210 merges or blends the ink image data and the frame data. The mixer unit 210 may be configured to combine or incorporate the ink image data and the frame data in any desired manner.

The mixer unit 210 or other blending-related processing of the display controller 200 may involve or include deciding, for each background pixel, whether the pixel is affected by the ink image data or not. If there is no ink stroke over that pixel, the background pixel is left unmodified. If the ink stroke completely covers the pixel, the color of the ink stroke is substituted. If the ink stroke partially covers the pixel, then antialiasing and/or other methods may be implemented. For example, an antialiasing method smoothes pixelated edges by blending between the two colors according to the proportion of the pixel covered by each color. In some cases, pixel coverage may be addressed by determining an alpha value for each pixel based on the proportion of the pixel covered, followed by an alpha blend operation, as described in the alpha compositing example above.

The mixer unit 210 is disposed along the pipeline such that the pipeline includes the mixer unit 210. In contrast, the ink rendering engine 206 is coupled to the pipeline. In this example, the ink rendering engine 206 is coupled to the pipeline via a data path that provides the ink image data to the mixer unit 210.

The display controller 200 also provides an example of a different architecture for introducing the frame data. In this case, the frame data stored in a memory 212 is provided to the mixer unit 210 rather than via the memory controller 204. The memory controller 204 is instead used to write the frame data to the memory 212. Read operations that provide the frame data may nonetheless be directed by the memory controller 204 but then provided to a memory bus or other data line accessible to the mixer unit 210.

The display controller 200 is similar to the above-described examples in that the ink image data is provided to the memory controller 204 for storage in the memory 212. As shown in FIG. 2, the display controller 200 includes a feedback line or other data connection from the ink rendering engine 206 to the memory controller 204. In still other cases, the ink image data may be provided from the ink rendering engine 206 to a memory bus or other data line from which the ink image data may be captured for storage in the memory 212. In such cases, the ink image data may not pass through the memory controller 204, but instead be nonetheless directed to the memory 212 by, e.g., the memory controller 204. Point at which the ink image data is introduced into the processing pipeline As with the above-described examples, the ink rendering engine 206 may include a processor or other processing unit or element 214. The processor 214 may be configured to generate the ink image data from touchscreen data as described above. The ink rendering engine 206 may also include one or more memories on which instructions and/or other data are stored. The memory(ies) may be embedded with the processor or otherwise integrated with one or more components of the ink rendering engine 206 to any desired extent.

Figure 3:
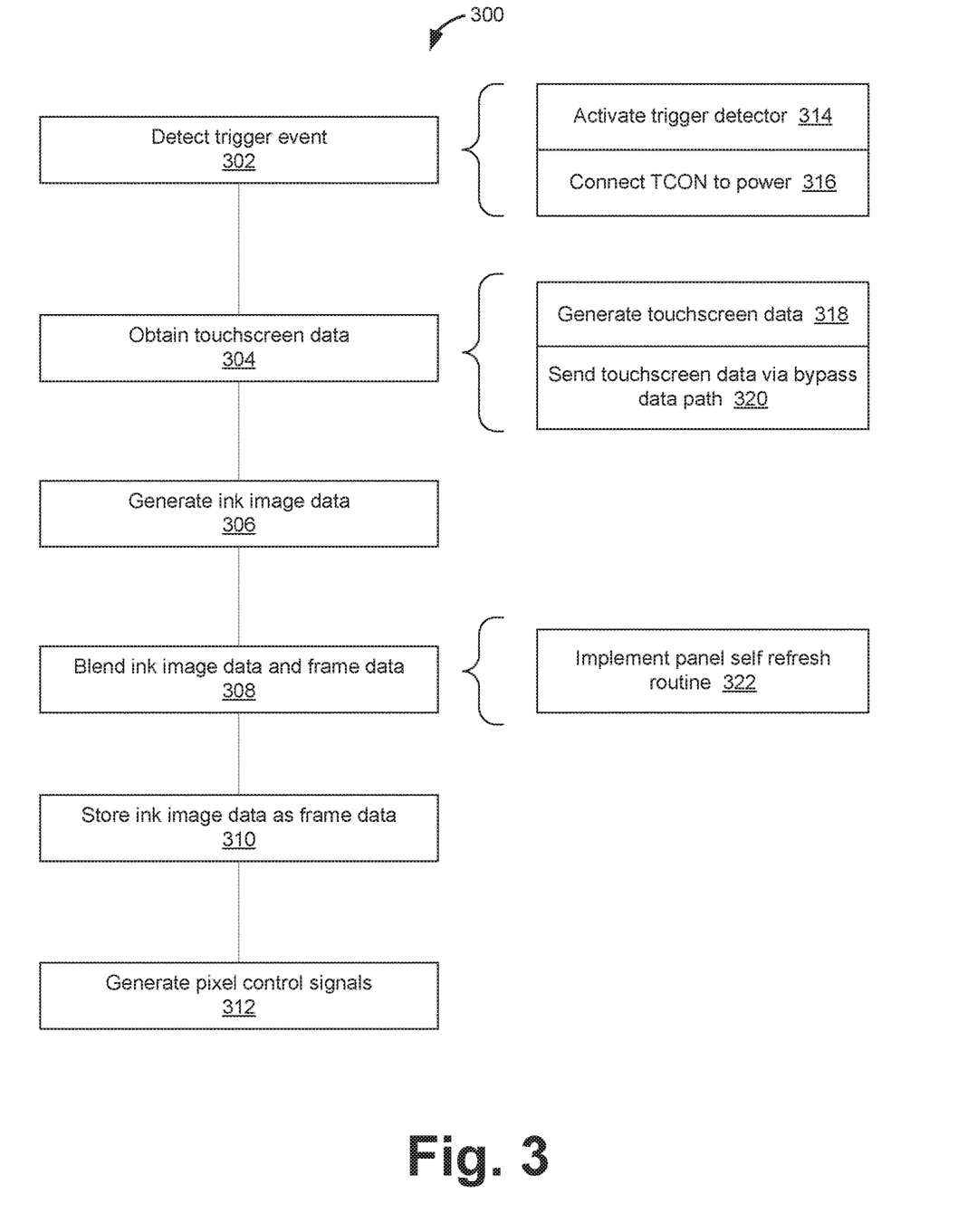
FIG. 3 is a flow diagram of a method of implementing display ink stroke rendering during system sleep in accordance with one example.

FIG. 3 depicts a method 300 of controlling a display of an electronic device. The method 300 may be implemented by one of the above-described devices or another device. Alternatively or additionally, the method 300 may be implemented in whole or in part via the execution of instructions by one of the above-described ink rendering engines or a processor thereof, such as the processor 214 (FIG. 2) and/or another processor or ink rendering engine. The instructions may be stored on a memory of the ink rendering engine and/or another memory.

The order of the acts of the method 300 may vary from the example shown. For instance, some of the acts may be concurrently implemented. For example, acts 306 and 308 may be concurrently implemented or implemented in a different order.

The method 300 may begin with one or more acts directed to entering a system sleep mode. For example, system level components such as a computing system processor and associated memory may be deactivated to an extent. One or more trigger sensors may be activated.

The method 300 includes an act 302 in which a trigger event is detected. The event detection occurs while a processor of the electronic device resides in a sleep mode. If the device does not reside in a sleep mode, implementation of the method 300 may be disabled. For instance, a trigger detector may be deactivated. Detection of the trigger event activates a display controller of the device, such as a timing controller.

The nature of the trigger event may vary. The sensor or other element(s) used to detect the trigger event may vary accordingly. The act 302 may include activating a display controller upon detection of the trigger event. To that end, the act 302 may also include toggling a power supply switch, as described above.

Touchscreen data is obtained in an act 304. The touchscreen data is indicative of an ink stroke. The touchscreen data may be captured and/or generated by a digitizer of a touchscreen. Data generated by the digitizer may be further processed by a touch processor, as described above.

In an act 306, ink image data is generated from the touchscreen data. The ink image data is generated via an ink rendering engine of the display controller.

In some cases, the ink image data is blended with frame data in an act 308. The blending may be implemented via a mixer, the ink rendering engine, and/or another component or element of a pipeline of the display controller. The frame data may be indicative of a background image, any number of previously rendered ink strokes, and/or any other image data.

The ink image data stored in an act 310 as frame data in a memory of the display controller. The storage of the ink image data may be provided via a feedback or other data path from the ink rendering engine to a memory controller of the display controller. The data path may be in addition to the data path(s) of the pipeline of the display controller.

In an act 312, pixel control signals representative of the ink image data are generated via the display controller. One or more pixel operations units of the display controller may be used to generate the pixel control signals.

In some cases, the act 302 may include activating a trigger detector of the device in an act 314. Upon detection of the trigger event, the display controller may be connected in an act 316 to a power supply. For instance, a switch may be closed via a control signal provided by the trigger detector.

Obtaining the touchscreen data in the act 304 may include generating the touchscreen data via a digitizer of the electronic device in an act 318, and sending the touchscreen data from the digitizer to the display controller via a bypass data path in an act 320. The bypass data path allows the touchscreen data to bypass the processor of the electronic device.

The act 308 may include implementing a panel self refresh routine in an act 322. The panel self refresh routine may include storage of frame data in the memory of the display controller. The panel self refresh routine may thus support the rendering of a background image, previously rendered ink strokes, and other static image data.

In one aspect, a device includes a display including a display panel and a touch sensor disposed along the display panel, a digitizer in communication with the touch sensor and configured to generate touchscreen data indicative of an ink stroke, a processor configured to generate image data for rendering on the display panel, and a display controller configured to receive the image data from the processor and to generate pixel control signals for the display panel from the image data. The display controller includes a memory configured to store frame data derived from the image data by the display controller, and an ink rendering engine configured to generate ink image data from the touchscreen data while the processor resides in a sleep mode. The ink rendering engine is coupled to the memory to store the ink image data in the memory as the frame data such that the pixel control signals generated for the display panel by the display controller direct the display panel to render the ink stroke while the processor remains in the sleep mode.

In another aspect, a display controller for a touchscreen display includes an image data input to which image data is provided, a pixel control output at which pixel control data is provided for the touchscreen display, the pixel control output being coupled to the image data input to define an image data processing pipeline, a memory disposed along the image data processing pipeline and configured to store frame data derived from the image data, a touchscreen input at which touchscreen data indicative of an ink stroke is received, and a rendering engine disposed along the image data processing pipeline, the rendering engine including a processor, the processor coupled to the touchscreen input to process the touchscreen data to generate ink image data from the touchscreen data. The rendering engine is coupled to the memory to store the ink image data in the memory such that the frame data stored in the memory includes the ink image data and that the pixel control data is representative of the ink stroke.

In yet another aspect, a method of controlling a display of an electronic device includes detecting a trigger event while a processor of the electronic device resides in a sleep mode, wherein detection of the trigger event activates a display controller for the display, obtaining touchscreen data indicative of an ink stroke, generating, via an ink rendering engine of the display controller, ink image data from the touchscreen data, storing the ink image data as frame data in a memory of the display controller, and generating, via the display controller, pixel control signals representative of the ink image data.

In connection with any one of the aforementioned aspects, the systems, devices, and/or methods described herein may alternatively or additionally include any combination of one or more of the following aspects or features. The device further includes a primary touchscreen data path via which the touchscreen data is provided from the digitizer to the processor, and a bypass touchscreen data path via which the touchscreen data bypasses the processor and is provided from the digitizer to the display controller. The display controller and the digitizer are activated by a trigger event while the processor remains in the sleep mode. The display controller includes a memory controller configured to implement a panel self refresh routine via storage of the frame data in the memory. The display controller is configured to blend the frame data from the ink rendering engine with background frame data stored in the memory. The processor includes a graphics processing unit configured to generate non-ink image data. The device further including a system-on-a-chip, the system-on-a-chip including the processor. The ink rendering engine includes an ink engine task-specific processor. The processor is coupled to the digitizer to receive the touchscreen data such that, when the processor is awake, the image data is indicative of the ink stroke. The display controller includes a timing controller. The pixel control signals are configured to direct source and gate drivers of the display panel. The rendering engine is configured to store the ink image data in the memory when the image data is not received via the image data input. The display controller further includes a memory controller configured to implement a panel self refresh routine via storage of the frame data in the memory. The rendering engine provides the ink image data to the memory via the memory controller. The display controller further includes a pixel operations unit disposed along the image data processing pipeline, the pixel operations unit being configured to generate the pixel control data. Obtaining the touchscreen data includes generating the touchscreen data via a digitizer of the electronic device, and sending the touchscreen data from the digitizer to the display controller via a bypass data path via which the touchscreen data bypasses the processor of the electronic device. The method further includes blending the ink image data generated by the ink rendering engine with background frame data stored in the memory. Blending the ink image data includes implementing a panel self refresh routine via storage of the frame data in the memory of the display controller.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A device comprising:
    a display comprising a display panel and a touch sensor disposed along the display panel;
    a digitizer in communication with the touch sensor and configured to generate touchscreen data indicative of an ink stroke;
    a first processor configured to generate image data for rendering on the display panel;
    a display controller configured to receive the image data from the first processor and to generate pixel control signals for the display panel from the image data;
    a primary touchscreen data path via which the touchscreen data is provided from the digitizer to the first processor; and
    a bypass touchscreen data path via which the touchscreen data bypasses the first processor and is provided from the digitizer to the display controller;
    wherein the display controller comprises:
        a memory configured to store frame data derived from the image data by the display controller; and
        an ink rendering engine configured to generate ink image data from the touchscreen data while the first processor resides in a sleep mode, the ink rendering engine including a second processor that is coupled to the touchscreen;
    wherein:
        the ink rendering engine is coupled to the memory to store the ink image data in the memory as the frame data such that the pixel control signals generated for the display panel by the display controller direct the display panel to render the ink stroke while the first processor remains in the sleep mode, and
        the second processor is not used for executing tasks other than ink engine rendering tasks.

2. The device of claim 1, wherein the display controller and the digitizer are activated by a trigger event while the first processor remains in the sleep mode.

3. The device of claim 1, wherein the display controller comprises a memory controller configured to implement a panel self refresh routine via storage of the frame data in the memory.

4. The device of claim 1, wherein the display controller is configured to blend the frame data from the ink rendering engine with background frame data stored in the memory.

5. The device of claim 1, wherein the first processor further generates non-ink image data.

6. The device of claim 1, further comprising a system-on-a-chip, the system-on-a-chip comprising the first processor.

7. The device of claim 1, wherein the first processor is coupled to the digitizer to receive the touchscreen data such that, when the first processor is awake, the image data is indicative of the ink stroke.

8. The device of claim 1, wherein the display controller comprises a timing controller.

9. The device of claim 1, wherein the pixel control signals are configured to direct source and gate drivers of the display panel.

10. A display controller for a touchscreen display, the display controller comprising:
    an image data input to which image data is provided;

a pixel control output at which pixel control data is provided for the touchscreen display, the pixel control output being coupled to the image data input to define an image data processing pipeline;

a memory disposed along the image data processing pipeline and configured to store frame data derived from the image data;

a touchscreen input at which touchscreen data indicative of an ink stroke is received;

a rendering engine disposed along the image data processing pipeline, the rendering engine comprising a first processor, the first processor coupled to the touchscreen input to process the touchscreen data to generate ink image data from the touchscreen data; and a bypass data path via which the image data is provided to the rendering engine when a second processor configured to generate the image data resides in a sleep mode, wherein:

the rendering engine is coupled to the memory to store the ink image data in the memory when the image data is not received via the image data input such that the frame data stored in the memory comprises the ink image data and that the pixel control data is representative of the ink stroke, and the first processor is not used for executing tasks other than ink engine rendering tasks.

11. The display controller of claim 10, wherein the image data is not received via the image data input when the second processor configured to generate the image data resides in the sleep mode.

12. The display controller of claim 10, further comprising a memory controller configured to implement a panel self refresh routine via storage of the frame data in the memory.

13. The display controller of claim 12, wherein the rendering engine provides the ink image data to the memory via the memory controller.

14. The display controller of claim 10, further comprising a pixel operations unit disposed along the image data processing pipeline for receiving the ink image data and generating the pixel control data.

15. A method of controlling a display of an electronic device, the method comprising:

detecting a trigger event while a first processor of the electronic device resides in a sleep mode, wherein detection of the trigger event activates a display controller for the display;

obtaining touchscreen data indicative of an ink stroke by generating the touchscreen data via a digitizer of the electronic device;

sending the touchscreen data from the digitizer to the display controller via a bypass data path via which the touchscreen data bypasses the first processor of the electronic device;

generating, via an ink rendering engine of the display controller, ink image data from the touchscreen data;

storing the ink image data as frame data in a memory of the display controller; and generating, via the display controller, pixel control signals representative of the ink image data, wherein the ink rendering engine includes a second processor, the second processor not being used for executing tasks other than ink engine rendering tasks.

16. The method of claim 15, further comprising blending the ink image data generated by the ink rendering engine with background frame data stored in the memory.

17. The method of claim 16, wherein blending the ink image data comprises implementing a panel self refresh routine via storage of the frame data in the memory of the display controller.

* * * * *